US008828104B2

(12) United States Patent
Boezi

(10) Patent No.: US 8,828,104 B2
(45) Date of Patent: Sep. 9, 2014

(54) TANK FUEL DRYING DEVICE

(71) Applicant: Brian Boezi, Myrtle Beach, SC (US)

(72) Inventor: Brian Boezi, Myrtle Beach, SC (US)

(73) Assignee: B3C Fuel Solutions LLC, Conway, SC (US)

(*) Notice: Subject to any disclaimer, the term of this patent is extended or adjusted under 35 U.S.C. 154(b) by 106 days.

(21) Appl. No.: 13/660,542

(22) Filed: Oct. 25, 2012

(65) Prior Publication Data

US 2013/0152460 A1 Jun. 20, 2013

Related U.S. Application Data

(60) Provisional application No. 61/576,617, filed on Dec. 16, 2011.

(51) Int. Cl.
*C10L 1/18* (2006.01)
*C10L 1/182* (2006.01)
*B01D 35/02* (2006.01)
*C10L 1/02* (2006.01)

(52) U.S. Cl.
CPC .............. *C10L 1/182* (2013.01); *B01D 35/02* (2013.01); *C10L 1/02* (2013.01)
USPC .............. 44/453; 44/451; 44/452; 210/172.1; 210/172.2; 210/172.4; 210/172.5; 210/238; 210/282; 210/490

(58) Field of Classification Search
CPC .............. B01D 35/027; B01D 35/0273; B01D 17/0208; B01D 17/0214; B01D 36/001; B01D 29/15; B60K 15/00; C10L 1/023
USPC .............. 44/453, 451, 452; 210/172.1, 172.2, 210/172.4, 172.5, 238, 282, 490
See application file for complete search history.

(56) References Cited

U.S. PATENT DOCUMENTS 3,992,493 A * 11/1976 Whyte et al. ............... 261/121.1
4,861,469 A * 8/1989 Rossi et al. ............... 210/172.5
5,130,018 A 7/1992 Tolman et al.
5,252,203 A * 10/1993 Lyda ........................ 210/172.5
5,993,656 A * 11/1999 Cordani ..................... 210/282

* cited by examiner

*Primary Examiner* — Cephia D Toomer
(74) *Attorney, Agent, or Firm* — Frost Brown Todd LLC

(57) ABSTRACT

A device and method for removing moisture from ethanol blended fuel in a fuel tank comprises a container made of a non-woven nylon fabric, a desiccant, and a gelling agent; wherein the desiccant and gelling agent are inside the container.

17 Claims, 3 Drawing Sheets

TANK FUEL DRYING DEVICE

CROSS REFERENCE TO RELATED APPLICATIONS

The present application hereby claims the benefit of the provisional patent application of the same title, Ser. No. 61/576,617, filed on Dec. 16, 2011, the disclosure of which is incorporated by reference herein in its entirety.

BACKGROUND

Water can be absorbed by and contaminate hydrocarbon fuel. It may enter the fuel tank holding the hydrocarbon fuel by condensation, hydroscopic attraction, or some other means. Fuel tanks and fuel delivery systems that use fuel contaminated by water will have problems such as icing, rust, and algae growth. In addition, the water can damage fuel injector pumps, injection nozzles, and carburetors.

Ethanol blended hydrocarbon fuels are particularly difficult to dry because the desiccants used to absorb water also absorb ethanol. If an ethanol is removed from an ethanol blended fuel when water is removed, the fuel will not perform as expected.

BRIEF SUMMARY

A device and method for removing moisture from ethanol blended fuel in a fuel tank comprises a container made of a non-woven nylon fabric, a desiccant, and a gelling agent; wherein the desiccant and gelling agent are inside the container.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

DETAILED DESCRIPTION

Figure 1:
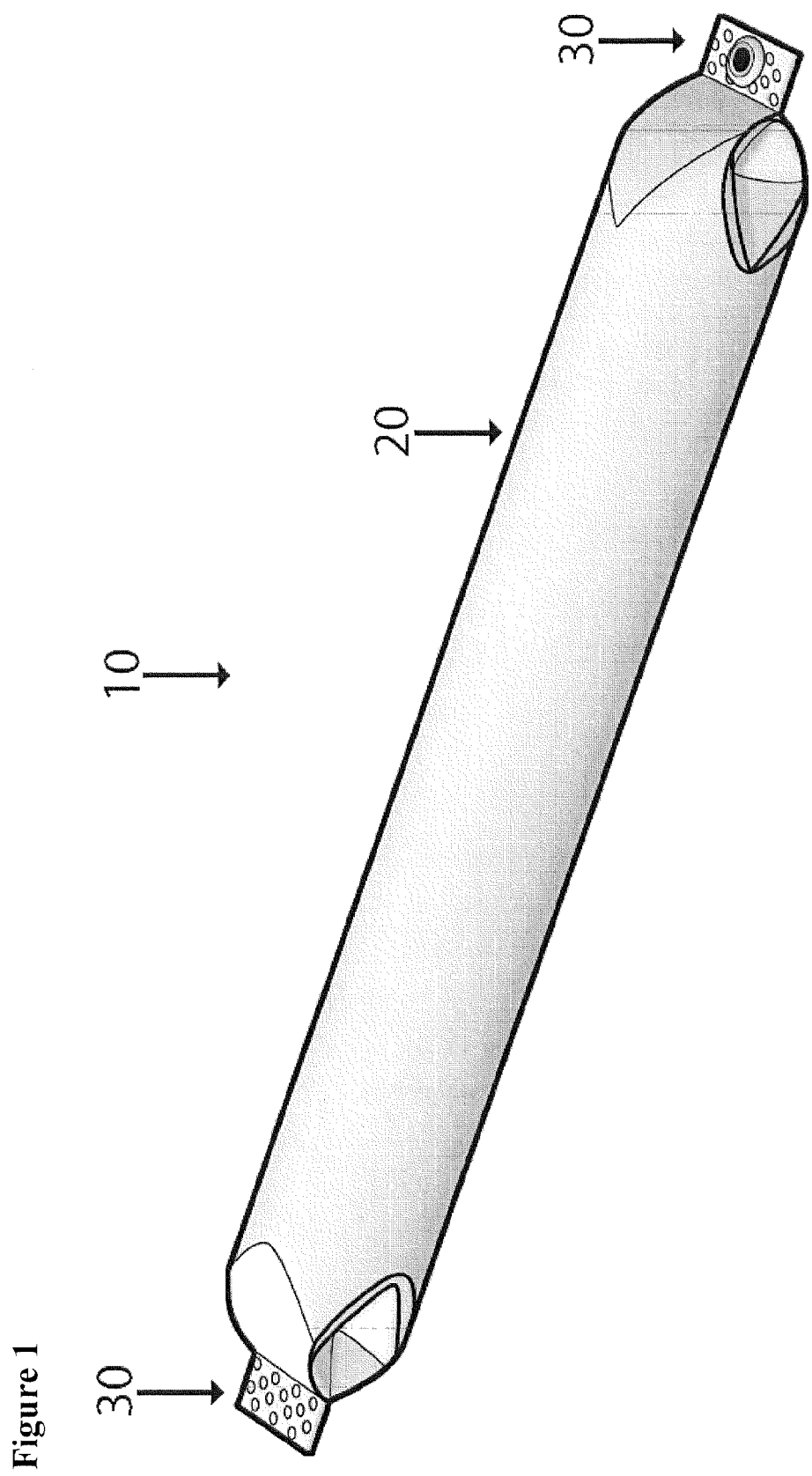
FIG. 1 is a perspective view of an embodiment of the device.
Figure 2:
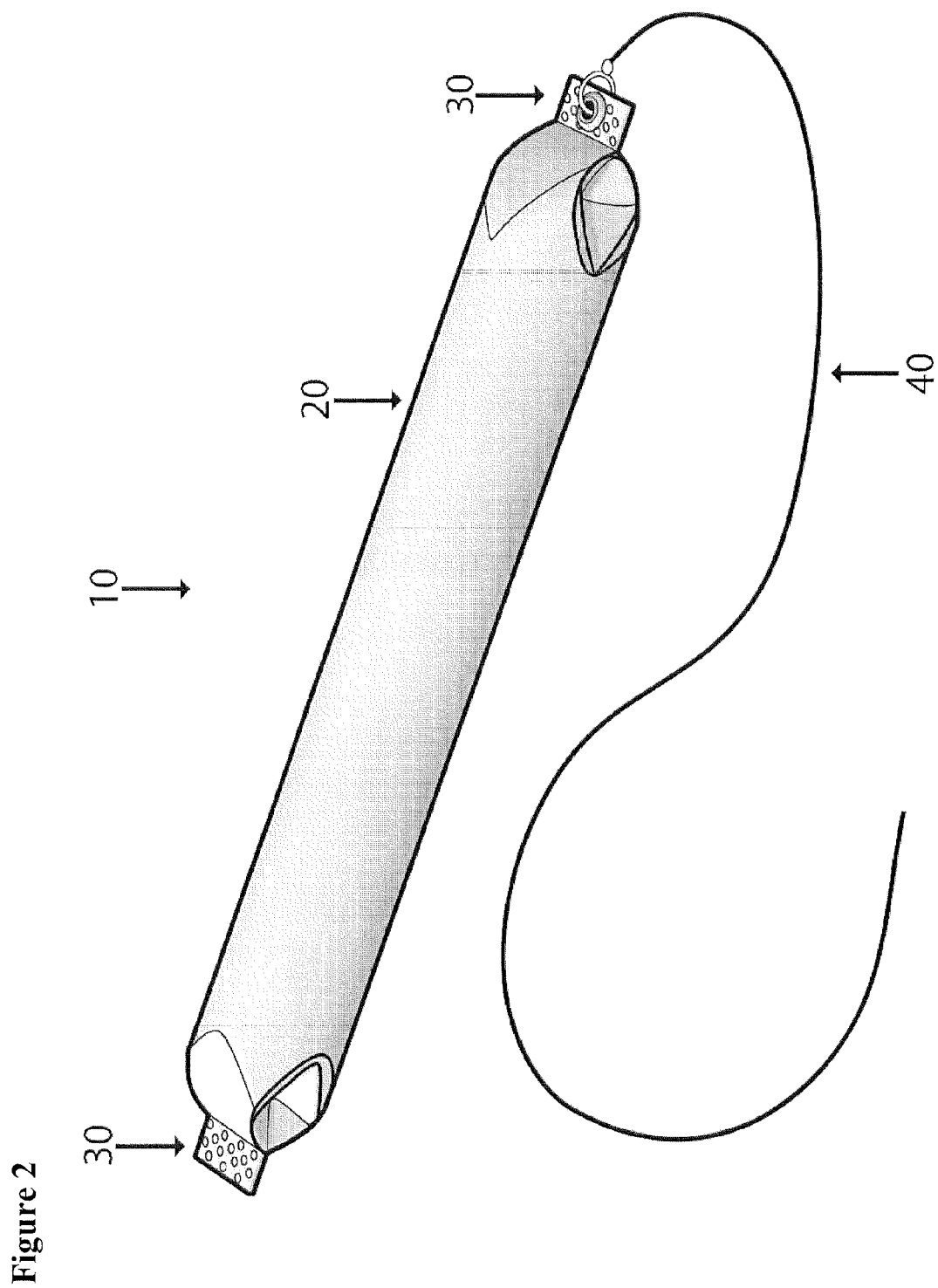
FIG. 2 is a perspective view of an embodiment of the device.
Figure 3:
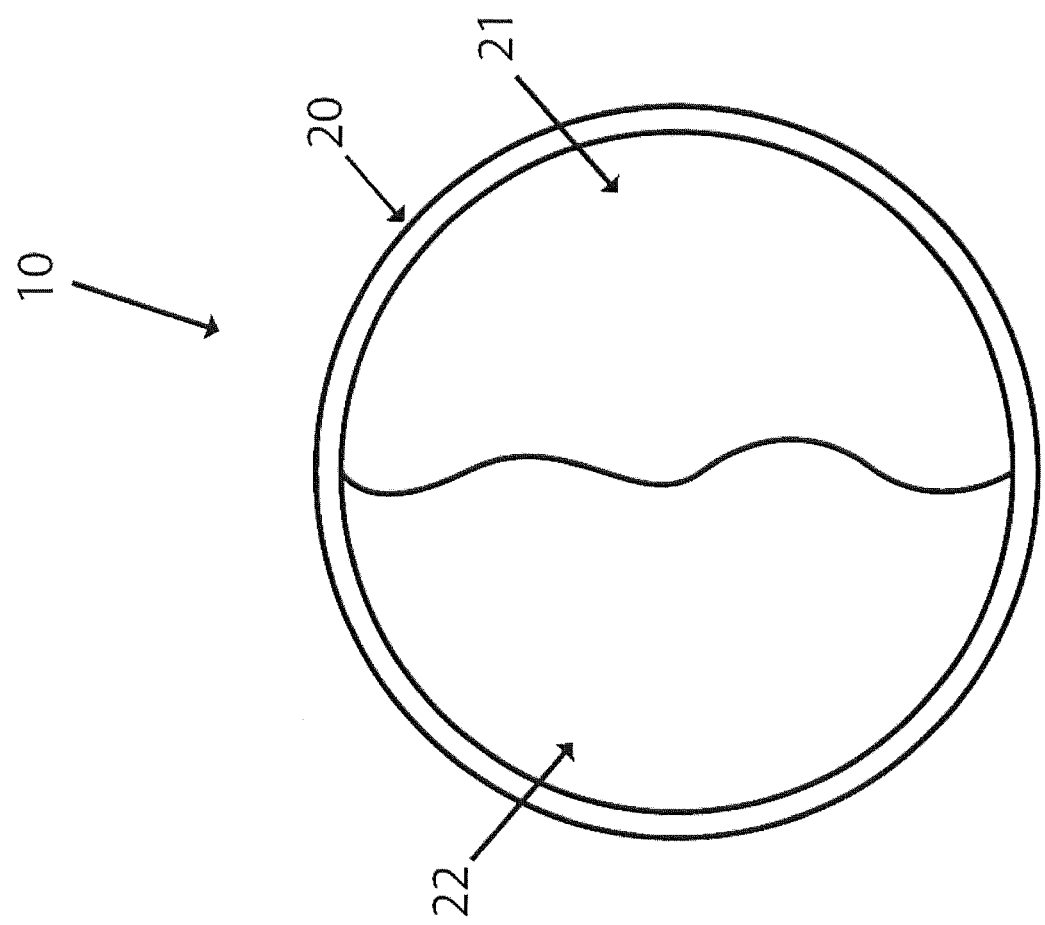
FIG. 3 is a cross section view of an embodiment of the device.

It is difficult to remove water from ethanol blended hydrocarbon fuels because the water becomes entrained or emulsified with the fuel. Water that is entrained in ethanol blended fuels does not separate into a second phase unless there is a significant amount of water present. But even fuels that have not phase separated contain enough water to damage engines. Drying ethanol blended fuels is particularly important because such fuels are more hydroscopic than un-blended fuels so they more readily absorb water. The desiccants that are typically used to absorb water from hydrocarbons do not work well with ethanol blended fuels.

The device (10) will absorb entrained water from ethanol blended fuels. It is also able to absorb water from fuels that have so much water that the water has separated into a second phase. When the desiccant (21) and gelling agent (22) have absorbed their capacity of water, the device (10) may be removed and a new device (10) may be added to the fuel.

In one embodiment, the device (10) for removing water is a container (20) made from a non-woven nylon fabric, a desiccant (21), and a gelling agent (22); wherein the desiccant (21) and gelling agent (22) are inside the container. This container (20) allows the free flow of fuel and water into and out of the container, while retaining the particles of the desiccant (21) and gelling agent (22). The container (20) and the desiccant (21) and gelling agent (22) should also be unharmed by and not harmful to the fuel or the environment in which it is to be used.

In one embodiment, the weight of the non-woven nylon fabric may be from about 2.0 osy (68 g/m$^2$) to about 5.0 osy (170 g/m$^2$), from about 2 osy to about 4.0 osy (136 g/m$^2$), from about 3 osy to about 4 osy, or about 3 osy). The term osy means ounces per square yard. In one embodiment, the container (20) must maintain dimensional stability across a large temperature range of about −30° F. to about 400° F.; which means it does not allow particles larger than about 0.1 microns, about 0.01 microns, or 0.5 microns to pass through it. In one embodiment, the container is made from nylon fabric that is thermally bonded filaments of nylon 6,6. Nylon 6,6 is made of hexamethylenediamine and adipic acid. The non-woven fabric is able to contain fine desiccant powder and fine gelling agent better than a woven fabric. In one embodiment, the fabric is PBN-II® or SPECTRAMAX®, both manufactured by Cerex. These fabrics allow ethanol blended fuel and phase separated water into the container while keeping fine powder in.

The advantages of a non-woven nylon fabric container (20) are that it can contain many different desiccants (21) and gelling agents (22), allow the ethanol blended hydrocarbon fuel and any phase separated water to pass through, and maintain its stability. Other fabrics that were tried for the container (20) would not work. These included fabrics made from: polypropylene, napped polypro, cotton, flannel, mono filament nylon, nylon, polypropylene micro felt, twill, melt blown polypropylene, polyester felt, and spun bonded polyester. These fabrics did not allow water into the container (20) so the fuel could not be dried.

In one embodiment, the device (10) is a container (20) constructed from a tube of non-woven nylon fabric that is sealed at both ends of the tube. The tube may be sealed by crimping to form a crimped end (30). It may be crimped by any means, for example by heat, pressure, or both. The container (20) may be permanently closed around the desiccant (21) and gelling agent (22) so that the device is disposable. In another embodiment, the device (10) comprises a container (20) that is only partially made from a non-woven nylon fabric. The remainder of the container (20) may be made from other fabrics or metal. In one embodiment, the device (10) takes the form of an elongated packet. A tether (40) may be attached to the container to assist the removal of the device (10) from the enclosed space.

The desiccant (21) is able to absorb water without absorbing a significant amount of ethanol. An example of a desiccant (21) is a molecular sieve. Molecular sieves are able to absorb and trap water. Other typical desiccants will not work well because they do not absorb water well in the presence of ethanol. The desiccant (21) should not be susceptible to degradation or to dissolution in hydrocarbon fuels. Examples of molecular sieves include aluminosilicate minerals, clays, porous glasses, microporous charcoals, zeolites, and active carbons. In one embodiment, the desiccant (21) is a zeolite material with a pore size of 3 to 4 angstroms. The zeolite material may have different sizes and shapes. It may be cylindrically, rod, pellet, round, or irregularly shaped. The size of the material may be, for example, about 4 mm×8 mm, 8 mm×12 mm, 1/16 inch, or 1/8 inch.

In one embodiment, the gelling agent (22) comprises a highly absorbent polymer. The gelling agent (22) is able to absorb phase separated water or phase separated water/ethanol mixtures. In one embodiment, the hydrocarbon fuel is an ethanol blended fuel. Examples of gelling agents (22) are hydroxy alkylated cellulose, which include hydroxypropyl cellulose, carboxymethyl cellulose, and hydroxyethyl cellulose. The molecular weight of the hydroxy alkylated cellulose can range from about 30,000 to about 1,000,000 (measured by gel permeation chromatography), from about 45,000 to about 75,000, from about 50,000 to about 60,000. The cellulose may have a coarse, regular, fine, or superfine grind. In one embodiment, the gelling agent (22) comprises hydroxypropyl cellulose. In another embodiment, the gelling agent (22) comprises hydroxypropyl cellulose, and the desiccant (21) is a molecular sieve.

The size of the device (10) may range from about 1 inch to about 24 inches in length. It may be designed to hold from about 1 gram to about 10,000 grams of desiccant (21) and gelling agent (22). In one embodiment, the device holds from about 1 g to about 5000 g, about 1 g to about 2000 g, about 2 g to about 1000 g, about 5 g to about 500 g, about 10 g to about 250 g, about 25 g to about 250 g of desiccant (21). In one embodiment, the device holds from about 1 g to about 5000 g, about 1 g to about 2000 g, about 2 g to about 1000 g, about 5 g to about 500 g, about 10 g to about 250 g, about 25 g to about 250 g of gelling agent (22). In one embodiment, the ratio of desiccant (21) to gelling agent (22) is about 1:1000, about 1:500, about 1:250, about 1:100, about 1:50, about 1:10, about 1:5, about 1:2, about 1:1, about 2:1, about 5:1, about 10:1, about 50:1, about 100:1, about 250:1, about 500:1, or about 1000:1. If more capacity is desired then more than one device (10) may be daisy chained together.

In one embodiment, the desiccant (21) and gelling agent (22) are a homogeneous mixture. In another embodiment, the desiccant (21) and gelling agent (22) are not a homogeneous mixture.

In one embodiment, additives are additionally contained inside the container (20). In one embodiment, one or more additive is homogeneously mixed with the desiccant (21) and gelling agent (22), with only the desiccant (21), or with only the gelling agent (22). In another embodiment, one or more additive is not homogeneously mixed with the desiccant (21) and gelling agent (22). An additive may be an anti-corrosive agent. An example of an anti-corrosive agent is tolyltriazole and benzotriazole. Other anti-corrosive agents are well known to persons of ordinary skill in the art. An additive may be an antioxidant. Examples of antioxidants are butylated hydroxytoluene (BHT) and butylated hydroxyanisole (BHA), as well as other hindered phenol derivatives which are well known. The antioxidants for example, may be prilled or powdered. An additive may be an indicator that indicates the presence or absence of water. An example indicator is methylene blue which will turn blue when the device (10) is no longer effective for absorbing water.

In one embodiment, the container (20) may be placed into a protective cage. The protective cage may be rigid to prevent the container (20) from being ripped or otherwise ruptured. The protective cage may prevent the container (20) from resting on a hot surface of the hydrocarbon fuel tank. In one embodiment, the container (20) does not use a protective cage. The fabric the container (20) is made from is robust enough to contain the desiccant (21) and is not affected by high temperatures.

In one embodiment, the container (20) is attached to a tether (40). In one embodiment, the tether may be attached to the device (10) through a grommet (50) or by sealing the tether inside a crimped end (30). The tether (40) allows the container (20) to be removed from a tank that is holding the hydrocarbon fuel. The tether (40) is, for example, an ultra high molecular weight polyethylene braid. Examples of high molecular weight polyethylene braid are Kevlar braid, such as Zebco® Omniflex braid and Jarden® Shakespeare braid. In one embodiment, the tether (40) has a thickness of about 0.01 inches when flattened or less than about 0.008 inches. The tether (40) is abrasion resistant, stable in hydrocarbon fuel, strong, and can be flattened. The tether (40) passes through the opening to the fuel tank and the fuel cap is sealed over the tether (40). Other materials for the tether (40) were tried but were not found to work, these include nylon fishing line, Teflon, wire, and twine. These materials would either not be stable or would interfere with the sealing of the fuel tank.

Phase separated fuels will have two phases with water or water and ethanol at the bottom and the hydrocarbon on top, because water is denser than the hydrocarbon fuel. In one embodiment, the device (10) is dense enough that it will sink into the water phase.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

Example 1

Device for Removing Moisture From Ethanol Blended Fuels

Hydroxypropyl cellulose (1 g), 3 angstrom molecular sieves (35 g), tolyltriazole (0.25 g), BHT (0.25 g), and methylene glue (0.0025 g) were mixed together. The mixture was placed into a non-woven nylon fabric (Cerex) container that is shaped into a tube. The ends of the tube were heat crimped closed. A tether was attached through one of the crimped ends.

Example 2

Testing Device in Ethanol Blended Fuels

The device of example 1 was placed into an ethanol blended fuel (1 L) that contained water (3 mL); the fuel appeared cloudy. In three hours, the ethanol blended fuel became clear, showing that the entrained water had been removed.

Example 3

Comparison Device: Crosslinked Polyacrylamide

Crosslinked polyacrylamide was placed into a polypropylene container that is shaped into a tube. The ends of the tube were heat crimped closed.

Example 4

Testing Crosslinked Polyacrylamide Comparison Device in Ethanol Blended Fuels

The device of example 3 was placed into an ethanol blended fuel (1 L) that contained water (3 mL); the fuel appeared cloudy. In three hours, the ethanol blended fuel remained cloudy, showing that the entrained water had not been removed.

Example 5

Comparison Device: Silica Gel device

A device was made as in example 3, except silica gel was placed in the polypropylene container instead of the crosslinked polyacrylamide. The device was tested as in example 4. After three hours, the ethanol blended fuel remained cloudy, showing that the entrained water had not been removed.

Example 6

Comparison Devices: Phase Separated Ethanol Blended Fuels

Devices were made as in example 3, except hydroxypropyl methylcellulose or hydroxyethyl cellulose were used instead of the crosslinked polyacrylamide. The devices were tested in ethanol blended fuel that had enough water added to it to phase separate. Neither the phase separated water nor the entrained water was removed.

Example 7

Comparison Devices: Fabric

Devices were made as in example 3, except the container was made from other fabric instead of polypropylene. The fabric used for the container were: napped polypro, cotton, flannel, mono filament nylon, nylon, polypropylene micro felt, twill, melt blown polypropylene, polyester felt, or spun bonded polyester.

The devices were tested in ethanol blended fuel that had enough water added to it to phase separate. The container fabric would not allow water to permeate any of the devices, so none of them removed the phase separated water.

What is claimed is:

1. A device for removing moisture from ethanol blended fuel in a fuel tank comprising a container made of a non-woven nylon fabric, a desiccant, and a gelling agent; wherein the desiccant and gelling agent are inside the container, wherein the desiccant comprises molecular sieves.

2. The device of claim 1, wherein the gelling agent comprises hydroxypropyl cellulose.

3. The device of claim 1, wherein a tether is attached to the container to allow the easy removal of the device from the fuel tank.

4. The device of claim 1, wherein the container is a tube with both ends crimped closed.

5. The device of claim 1, wherein the device additionally comprises an anti-corrosive agent inside the container.

6. The device of claim 5, where the anti-corrosive agent is tolyltriazole.

7. The device of claim 1, wherein the device additionally comprises an antioxidant inside the container.

8. The device of claim 1, wherein the device additionally comprises methylene blue inside the container.

9. The device of claim 1, wherein the nylon fabric is from about 2.0 osy to about 5.0 osy in weight.

10. The device of claim 1, wherein the nylon fabric has dimensional stability between about −30° F. and about 400° F.

11. A method for removing moisture from ethanol blended fuel by adding a device to the fuel, where the device comprises a container made of a non-woven nylon fabric, a desiccant, and a gelling agent; wherein the desiccant and gelling agent are inside the container, wherein the desiccant comprises molecular sieves.

12. The method of claim 11, wherein the gelling agent comprises hydroxypropyl cellulose.

13. The method of claim 11, wherein a tether is attached to the container to allow the easy removal of the device from the fuel tank.

14. The method of claim 11, wherein the device additionally comprises an anti-corrosive agent inside the container.

15. The method of claim 11, wherein the device additionally comprises an antioxidant inside the container.

16. The method of claim 11, wherein the device additionally comprises methylene blue inside the container.

17. A device for removing moisture from ethanol blended fuel in a fuel tank comprising a container made of a non-woven nylon fabric, a desiccant, and a gelling agent; wherein the desiccant and gelling agent are inside the container, wherein the gelling agent comprises hydroxypropyl cellulose.

* * * * *